United States Patent
Li et al.

(10) Patent No.: US 7,555,638 B2
(45) Date of Patent: Jun. 30, 2009

(54) METHOD AND APPARATUS FOR EFFICIENTLY ARRANGING PORTABLE EXECUTABLE (PE) IMAGES

(75) Inventors: Yufu Li, Shanghai (CN); Xiang Ma, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 419 days.

(21) Appl. No.: 10/566,546

(22) PCT Filed: Dec. 24, 2005

(86) PCT No.: PCT/CN2005/002306

§ 371 (c)(1), (2), (4) Date: Jan. 27, 2006

(87) PCT Pub. No.: WO2007/073610

PCT Pub. Date: Jul. 5, 2007

(65) Prior Publication Data

US 2008/0059781 A1 Mar. 6, 2008

(51) Int. Cl.
G06F 9/24 (2006.01)
G06F 15/177 (2006.01)
G06F 1/24 (2006.01)

(52) U.S. Cl. .............................. 713/1; 713/2; 713/100; 717/162

(58) Field of Classification Search ..................... 713/1, 713/2, 100
See application file for complete search history.

(56) References Cited

U.S. PATENT DOCUMENTS 5,701,476 A * 12/1997 Fenger ........................ 713/2
5,794,049 A * 8/1998 Lindholm ................... 717/136
6,128,732 A * 10/2000 Chaiken ....................... 713/2
6,298,422 B1 * 10/2001 Spilo et al. ................. 711/154
6,883,078 B2 * 4/2005 Chen ......................... 711/165
2003/0014561 A1 * 1/2003 Cooper ....................... 709/321
2004/0158828 A1 * 8/2004 Zimmer et al. ............. 717/168
2005/0071617 A1 * 3/2005 Zimmer et al. ................ 713/1
2005/0188368 A1 8/2005 Kinney
2006/0026569 A1 * 2/2006 Oerting et al. .............. 717/126

OTHER PUBLICATIONS

Matt Pietrek, "An In-Depth Look into the Win32 Portable Executable File Format", Feb. 2002, MSDN Magazine, published by Microsoft Corporation.*
Microsoft Portable Executable and Common Object File Format Specification, Revision 6.0, Feb. 1999.

* cited by examiner

Primary Examiner—Thomas Lee
Assistant Examiner—Ji H Bae
(74) Attorney, Agent, or Firm—D'Ann Naylor Rifai

(57) ABSTRACT

When a processing system boots, an image loader may determine whether a portable executable (PE) image for a platform firmware runtime service includes a discardable section. The image loader may load part of the PE image into runtime memory to be used by the platform firmware. In response to determining that the PE image includes a discardable section, the image loader may omit at least part of the discardable section when loading the PE image into the runtime memory. Instead, the image loader may load the discardable section into boot-time memory. In another embodiment, the image loader may pre-allocate an area of runtime memory for PE images, and may load sections from multiple PE images into the pre-allocated area. Also, the image loader may use an alignment granularity that is smaller than the page size when loading the PE images into the pre-allocated area. Other embodiments are described and claimed.

21 Claims, 4 Drawing Sheets

US 7,555,638 B2

METHOD AND APPARATUS FOR EFFICIENTLY ARRANGING PORTABLE EXECUTABLE (PE) IMAGES

CROSS-REFERENCE TO RELATED APPLICATION

This application is a National Phase application of, and claims priority to, International Application No. PCT/CN2005/002306, filed Dec. 24, 2005, entitled METHOD AND APPARATUS FOR EFFICIENTLY ARRANGING PORTABLE EXECUTABLE (PE) IMAGES.

FIELD OF THE INVENTION

The present disclosure relates generally to the field of data processing, and more particularly to methods and related apparatus involving portable executable (PE) images.

BACKGROUND

In a typical legacy data processing system, firmware provides the machine instructions that control the system when the system is being powered up or has been reset, but before an operating system (OS) is booted. That is, the firmware controls the pre-OS or pre-boot operations. Firmware may also control certain operations after the OS has been loaded, such as operations for handling certain hardware events and/or system interrupts. The firmware may handle pre-boot and post-boot operations through a set of routines referred to collectively as a basic input/output system (BIOS). The BIOS thus provides the interface between the hardware components of the system and software components such as the OS. Accordingly, firmware for a legacy system is generally written specifically for the hardware platform within which the firmware will operate.

For purposes of this disclosure, the term "firmware" is used to refer to software that may execute in a processing system before the processing system has booted to an OS, software that may provide runtime services that allow the OS or other components to interact with the processing system hardware, and similar types of software components. Traditionally, firmware has typically been stored in non-volatile memory. In more recent years, however, processing systems have been developed that store firmware in or obtain firmware from other types of storage devices or from remote repositories.

In addition, not long ago, the Extensible Firmware Interface (EFI) model was announced. The EFI model provides a model for an interface between platform firmware and higher-level software such as operating systems. Version 1.10 of the EFI Specification, dated Dec. 1, 2002, may be obtained from www.intel.com/technology/efi/main_specification.htm. The EFI specification defines a set of standard interfaces and structures to be provided by low-level platform firmware. Those interfaces and structures may be used for tasks such as loading additional firmware, running pre-boot applications, booting the OS, and providing runtime services after an OS has been booted.

The EFI model requires software modules such as firmware drivers, pre-OS applications, and modules for providing runtime services to be formatted according to the portable executable (PE) format. The PE format is the file format that Microsoft Corporation adopted as the standard format to be used for executable files to run under operating systems such as Microsoft® Windows® NT, Microsoft® Windows® XP, Microsoft® Windows® 2000, and Microsoft Windows CE®. The term "portable executable" reflects an intention to provide a common format for executable files for multiple operating systems. PE files may run on multiple different hardware platforms, including 32-bit architectures and 64-bit architectures. Microsoft® linkers can be used to generate executable files in the PE format from object files in the Common Object File Format (COFF). COFF is the file format used for object files generated by Microsoft® compilers. The PE format and the COFF format are both described in revision 6.0 of the "Microsoft Portable Executable and Common Object File Format Specification," dated February 1999 (the "PE/COFF Specification"), available at www.microsoft.com/whdc/system/plafform/firmware/PECOFF.mspx. One advantage of using PE images pertains to flexibility, as a PE image is easy to relocate from one memory base to another, as long as the image contains relocation data.

Platform frameworks based on the EFI model, such as the Intel® Platform Innovation Framework for EFI, are expected to supplant frameworks based on the conventional BIOS model within the next few years as the frameworks of choice for designing, building, and operating data processing systems. An EFI-based platform framework may include low-level firmware or software that provides boot and runtime service calls that are available to other software components, such as the operating system and its loader. In particular, EFI-based platform frameworks are expected to use a modular architecture, in which the PE image format is used by the firmware or software modules that provide service calls such as those referenced above.

Conventional PE image files are organized into sections or segments. For purposes of this disclosure, the modules for providing runtime services within an EFI-based framework may be referred to in general as runtime drivers. Generally, the PE image for a runtime driver will have four segments, known as .data, .rdata, .text, and .reloc. By default, all of the code will be put into the text segment, and all writeable data will be put in the .data segment.

Runtime drivers are required to reside in a special memory range to provide EFI runtime services for the OS. Typically, this memory range is referred to as the EFI runtime memory. The OS preserves the EFI runtime memory for the exclusive use of the runtime drivers.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

Figure 1:
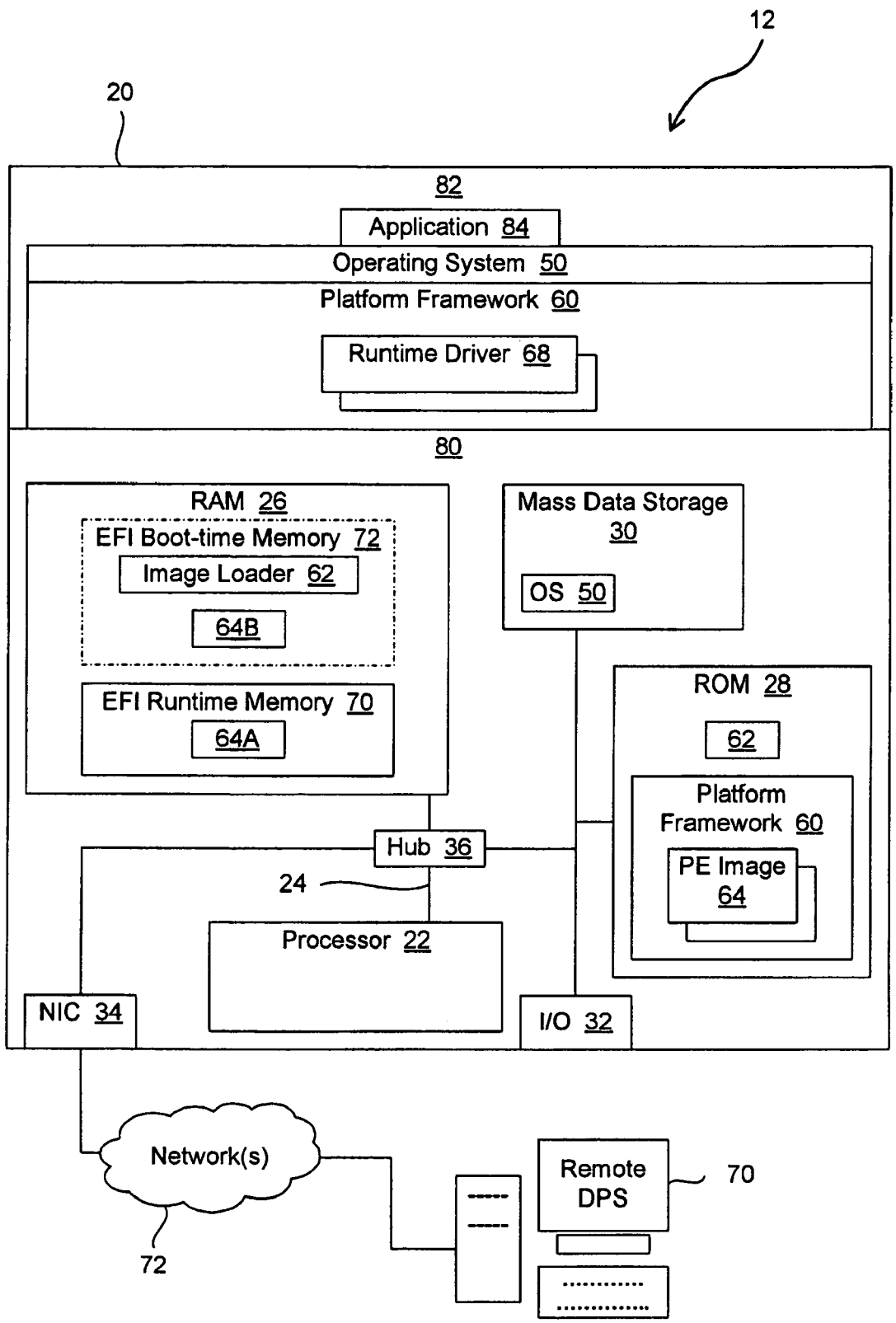
FIG. 1 is a block diagram depicting a suitable data processing environment in which certain aspects of an example embodiment of the present invention may be implemented.

Since the OS preserves the EFI runtime memory for the exclusive use of the runtime drivers, the more memory space that is required for runtime drivers, the less memory space is left for use by the OS. Therefore, as recognized by the present invention, it may be beneficial for firmware to reduce or minimize the runtime memory usage. Minimizing or reducing the runtime memory footprint in EFI-based firmware may provide more available memory for the OS to use in the runtime environment, which may provide increased performance for the applications utilized by the end user.

In a conventional EFI-based platform framework, the entire image for each runtime driver is stored in the EFI runtime memory. Consequently, the amount of runtime memory occupied by a runtime driver is identical or almost identical to its PE image size. One or more embodiments of the present invention make it possible to store a smaller runtime driver in the EFI runtime memory, thereby leaving more memory available for use by the OS.

As described in greater detail below, in the example embodiment, instead of loading all of the code and data from the runtime driver images into the EFI runtime memory, an image loader for an EFI-based platform framework may load only some of the code and data from those PE images into the runtime memory. The code and data that is not loaded into the runtime memory may include code and data that are only needed for boot-time operations such as driver initialization. For instance, when populating the runtime memory, the image loader may omit the initialization code and related data that are not needed once the runtime drivers have been successfully loaded and initialized.

The contents of a conventional a PE image are organized by section. A runtime driver typically has four sections: .data, .rdata, .text, and .reloc. All the code resides in the text segment, and all the writable data resides in the data segment. When they code all resides in the same section, and the data all resides in the same section, the image loader may be unable to differentiate any portions of that code or data, and may simply load all of the code and data into the runtime memory.

According to the example embodiment, to facilitate more selective and efficient use of the runtime memory, when a runtime driver is being generated or built, the linker may store the code for boot-time operations in a different section from the code for runtime operations. Similarly, the data for boot-time operations may be stored in a different section from the data for runtime operations. In addition, the linker may set an attribute for the boot-time sections to flag those sections as discardable.

Furthermore, the image loader may take those section attributes into account, and may put the discardable sections into the boot-time memory, rather than the runtime memory.

The main purpose of a runtime driver is typically to provide runtime services to the OS. However, the driver may need to perform initialization operations during boot time. The code developer may use compiler options to put the code and data that are needed only in boot time into separate sections. For example, a developer could use following compiler options with a visual C (VC) compiler from Microsoft to build the code for boot-time operations into one section (named ".initc") and the code for runtime operations into a different section (named ".initd"):

```
#pragma comment (linker,"/SECTION: .initc, RED")
#pragma code_seg (".initc")
EFI_STATUS
DriverEntryPoint (
    IN EFI_HANDLE      ImageHandle,
    IN EFI_SYSTEM_TABLE   *SystemTable
    ) {
    ........
}
Pragma code_seg ( )
```

The section names (e.g., .initc and .initd) may be selected by the developer. In alternative embodiments, the developer may use different sections names, preferably avoiding the compiler reserved names such as .data, .rdata, .text, .reloc, etc.

The C language code sample set forth above creates the section ".initc" for the boot-time code, and puts the "DriverEntryPoint" function code into this section. This "DriverEntryPoint" function is only invoked in boot time for the runtime driver initialization. The above sample also uses a compiler directive to assign the discardable attribute to this section. Specifically, the first line of the sample sets the following attributes: readable (R), executable (E), and discardable (D). By contrast, sections of the driver to operate in the runtime environment may be defined without the discardable attribute.

By default, the linker may put all of the code into the .text section. The linker may use substantially conventional processing to load the section without the discardable attribute into the text section, and to put all of the discardable sections at the bottom of the file image. Alternatively, any other suitable tool may be used to cause the discardable sections to be placed at the bottom of the file image when the driver is linked.

The PE/COFF image loader may then put all discardable section into the boot-time memory, and all other sections into the runtime memory. Since a driver's whole image may not be loaded into one continuous memory address space, the image loader may use different image base addresses when fixing up the loaded sections. A section loaded into runtime memory may be fixed up by the new runtime image base, while a discardable section loaded into boot-time memory may be fixed up according to its current location.

For instance, a PE image may be linked with a default base address (e.g., address A). If the image is then loaded into runtime memory starting from address A, there may be no need to fix up the image again. However, if the image is loaded into runtime memory starting from a different address (e.g., address B), the image should then be fixed up by using address B as the new base address for the runtime image. Furthermore, discardable sections may be loaded into boot-time memory, rather than into runtime memory (e.g., starting at address C). Those boot-time sections may not be consecutive with the non-discardable sections. If the size of the previously loaded runtime sections is X, from the perspective of the boot-time section, the image may appear to have been loaded starting at C-X. Accordingly, the image loader may use C-X as the base address to fix up that boot-time section.

To further reduce the amount of runtime memory needed for runtimes drivers, the image loader may also put the image file headers into boot time memory. The image loader may also pre-allocate a large, continuous block of runtime memory, and may load all of the runtime drivers into that space one after another. The image loader may also copy the fix-up data for the runtime code, but not the fix-up data for boot-time code, into the runtime memory.

In particular, PE/COFF images typically include some extra data, besides the information in the .data, .rdata, .text, and .reloc sections. That extra data may be referred to as the image header information, and it may include constructs such as the PE file header, the optional header, and section headers. The image header information is generally used by the image loader to load and relocate the image during boot time. The image header information in a typical PE image may occupy approximately 600 bytes. In the example embodiment, the image loader loads the image header information into the boot-time memory.

Regarding placement of the runtime drivers, conventional EFI-based firmware loads each image base at a page boundary. Consequently, since the size of a PE image commonly is not a multiple of the page size, the last page of each image may include a substantial amount of unused space. In the example embodiment, the image loader places the runtime drivers more tightly in the runtime memory. For instance, the runtime memory requirement for a boot process may be recorded. In a subsequent boot process, the image loader may use the recorded memory requirement to determine an anticipated runtime memory requirement, and may pre-allocate a single chunk of runtime memory that is large enough to satisfy the anticipated runtime memory requirement. In one embodiment, each time the system boots, the image loader determines the runtime memory size used by the runtime image, and the image loader stores that size into a variable in non-volatile storage. In addition, the image loader may determine the anticipated memory requirements for the current boot, based on the amount of memory used previously, as indicated above. After two or more boots, the memory allocation may stabilize.

Also, rather than using page boundaries as the metric for aligning images, the image loader may use a more finely grained alignment metric (i.e., a metric that provides more than one division or boundary per page). For example, rather than aligning images on a 4 kilobyte (KB) or 8 KB page boundary, the image loader may load each runtime image into the pre-allocated runtime memory aligned on an 8 byte, a 16 byte, a 32 byte, or any other suitable alignment boundary less than the page boundary. This technique of using an alignment granularity that is smaller than the page size may save, on average, approximately half a page per runtime driver.

With regard to the fix-up data, since the developer and compiler may separate code and data for boot-time and runtime operations into different sections. The fix-up data for the boot-time sections may not be needed at runtime, Accordingly, the image loader may copy only the fix-up data for the runtime code and data relocation into the runtime memory. This technique may further reduce the runtime memory footprint of the platform framework.

An experiment was conducted for a prototype desktop processing system to utilize runtime memory according to one or more of the techniques introduced above. The platform framework for that system had nine runtime drivers. Under conventional techniques, those drivers resulted in a runtime memory footprint occupying seventeen pages. When the techniques introduced above were used in that system, the runtime memory footprint occupied only nine pages. Thus, nearly a fifty percent reduction in the memory footprint was realized. In addition, server platforms may utilize more runtime drivers, such as server management and related drivers. Server platform may therefore also receive substantial benefits from the above teachings.

FIG. 1 is a block diagram depicting a suitable data processing environment 12 in which certain aspects of an example embodiment of the present invention may be implemented. Data processing environment 12 includes a processing system 20 that includes various hardware components 80 and software components 82. The hardware components may include, for example, a processor or central processing unit (CPU) 22, or multiple processors, communicatively coupled to various other components via one or more system buses 24 or other communication pathways or mediums.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers (PCs), workstations, servers, portable computers, laptop computers, tablet computers, personal digital assistants (PDAs), telephones, handheld devices, entertainment devices such as audio and/or video devices, and other devices for processing or transmitting information.

Processing system 20 may be controlled, at least in part, by input from conventional input devices, such as a keyboard, a pointing device such as a mouse, etc. Processing system 20 may also respond to directives or other types of information received from other processing systems or other input sources or signals. Processing system 20 may utilize one or more connections to one or more remote data processing systems 70, for example through a network interface controller (NIC) 34, a modem, or other communication ports or couplings. Processing systems may be interconnected by way of a physical and/or logical network 72, such as a local area network (LAN), a wide area network (WAN), an intranet, the Internet, etc. Communications involving network 72 may utilize various wired and/or wireless short range or long range carriers and protocols, including radio frequency (RF), satellite, microwave, Institute of Electrical and Electronics Engineers (IEEE) 802.11, 802.16, 802.20, Bluetooth, optical, infrared, cable, laser, etc.

Within processing system 20, processor 22 may be communicatively coupled to one or more volatile or non-volatile data storage devices, such as RAM 26, read-only memory (ROM) 28, mass storage devices 30 such as integrated drive electronics (IDE) or small computer system interface (SCSI) hard drives, and/or other devices or media, such as floppy disks, optical storage, tapes, flash memory, memory sticks, compact flash (CF) cards, digital video disks (DVDs), etc. For purposes of this disclosure, the term "ROM" may be used in general to refer to non-volatile memory devices such as erasable programmable ROM (EPROM), electrically erasable programmable ROM (EEPROM), flash ROM, flash memory, etc. Processor 22 may also be communicatively coupled to additional components, such as video controllers, SCSI controllers, network controllers, universal serial bus (USB) controllers, I/O ports 32, input devices such as a keyboard, a mouse, a camera, etc. Processing system 20 may also include one or more bridges or hubs 36, such as a memory controller hub, an I/O controller hub, a peripheral component interconnect (PCI) root bridge, etc., for communicatively coupling system components. As used herein, the term "bus" includes pathways that may be shared by more than two devices, as well as point-to-point pathways.

Some components, such as NIC 34, for example, may be implemented as adapter cards with interfaces (e.g., a PCI connector) for communicating with a bus. Alternatively, NIC 34 and other devices may be implemented as on-board or embedded controllers, using components such as programmable or non-programmable logic devices or arrays, application-specific integrated circuits (ASICs), embedded computers, smart cards, and the like.

The invention is described herein with reference to or in conjunction with data such as instructions, functions, procedures, data structures, application programs, configuration settings, etc. When the data is accessed by a machine, the machine may respond by performing tasks, defining abstract data types or low-level hardware contexts, and/or performing other operations, as described in greater detail below. The data may be stored in volatile and/or non-volatile data storage. For purposes of this disclosure, the term "program" is used in general to cover a broad range of software constructs, including applications, routines, methods, modules, drivers, subprograms, processes, and other types of software components.

For instance, data storage device 30 and/or ROM 28 may include various sets of instructions which, when executed, perform various operations. Such sets of instructions may be referred to in general as software.

As illustrated in FIG. 1, in the example embodiment, when processing system 20 is running, it may include programs or software components 82 such as a platform framework 60, an operating system (OS) 50, and one or more applications 84. Platform framework 60 may include various runtime drivers 68 for providing runtimes services to OS 50 and/or other modules.

In the example embodiment, the programs which implement platform framework 60 may be stored in ROM 28, and some or all of those programs may be loaded into RAM 26 when processing system 20 boots. The programs in ROM 30 may provide a wide variety of services. For instance, those programs may include one or more PE images 64, as well as an image loader 62 for loading the PE images into RAM 26 during the boot process. Image loader 62 may be considered part of platform framework 60, or it may be an independent module. Once loaded into RAM 26 as part of platform framework 60, PE images 64 (or corresponding drivers) may provide various boot-time and/or runtime services in processing system 20.

In the example embodiment, platform framework 60 uses both boot-time memory 72 and runtime memory 70 during the boot process. However, after processing system 20 has booted OS 50, OS 50 may use the space in RAM 26 that platform framework 60 used as boot-time memory. OS 50 will not use runtime memory 70, however, as that area contains runtime drivers 68. In FIG. 1, the block for boot-time memory 72 uses a dashed outline to indicate that boot-time memory may cease to exist when processing system 20 has finished booting.

The PE images in a processing system may well include images for drivers that provide services only during boot time (i.e., images for boot-time drivers), as well as images for drivers that provide services at runtime (i.e., images for runtime drivers). Some runtime drivers may provide services during runtime and during boot time. Since the present disclosure focuses primarily on runtime drivers, FIG. 1 only shows the images for the runtime drivers among PE images 64.

At or near the beginning of the boot process, processing system 20 may load image loader 62 from ROM into boot-time memory 72. Image loader 62 may then load PE images 64 into RAM 26. In particular, as described above, image loader 62 may load one part of each PE image 64 into runtime memory 70, and another part of each PE image 64 into boot-time memory 72. For example, blocks 64A and 64B in RAM 26 represent parts of PE image 64 that have been loaded into runtime memory 70 and boot-time memory 72, respectively. In addition, after each PE image 64 has been loaded into RAM 26, the portion that resides in runtime memory 70 may be referred to as a runtime driver 68. Thus, each runtime driver 68 illustrated among software components 82 corresponds to a respective PE image 64.

Figure 2:
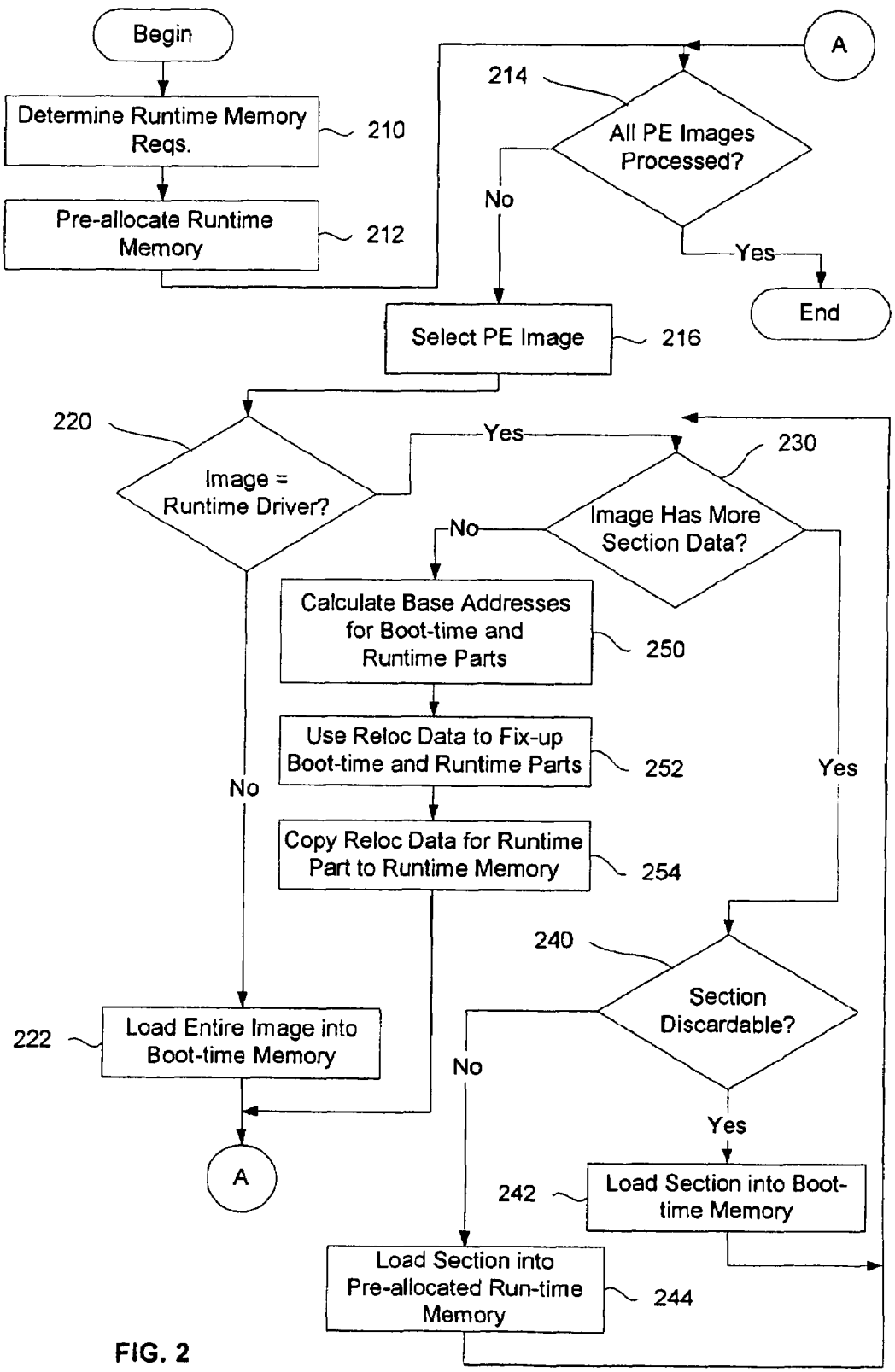
FIG. 2 is a flowchart depicting various aspects of a process for managing PE images, according to an example embodiment of the present invention.

FIG. 2 is a flowchart depicting various aspects of a process for managing PE images, according to an example embodiment of the present invention. The illustrated process begins in the process for booting processing system 20, after image loader 62 has been loaded into RAM 26. The illustrated process may be performed for each PE image in platform framework 60. At block 210, image loader 62 reads image headers for the current PE image 64, and determines (i.e., calculates or estimates) the amount of runtime memory that will be required by platform framework 60. For instance, image loader 62 may calculate the amount of space needed for runtime memory 70 based on stored data in processing system indicating how much space was needed for runtime memory in a previous boot. As indicated at block 212, image loader 62 may then pre-allocate a block of space in RAM 26 as runtime memory 70 for holding runtime drivers 68, based on the determination of how much runtime memory will be required.

As depicted at block 214, image loader 62 may then begin processing each PE image 64 of platform framework 60 by determining whether there are any more PE images 64 in platform framework 60 left to process. The process may end once all of the images have been processed. However, to process each image, image loader 62 may select or retrieve one of the unprocessed PE images 64 from ROM 28, as indicated at block 216. Image loader 62 may then determine whether the selected image is for a runtime driver, as indicated at block 220. In one embodiment, image loader 62 makes this determination based on a field named 'Subsystem' in the optional header of the image. If the image is not for a runtime driver (e.g., if it is for a driver to be used only during boot-time), image loader 62 may load the entire image into boot-time memory 72, as indicated at block 222, and the image loader may then move to the next image, if any.

However, if the image is for a runtime driver, image loader 62 may begin processing the sections within the image. For example, as indicated at block 230 and 240, for each section to be processed, image loader 62 may determine whether the section is discardable. Discardable sections may be loaded into boot-time memory 72, and non-discardable sections may be loaded in to runtime memory 70, as indicated at blocks 242 and 244, respectively. In the example embodiment, all the relocation data in the reloc section is copied into boot-time memory 72 for fixing up purpose when the image is loaded.

Once all sections have been loaded, the process may pass from block 230 to block 250, which depicts image loader 62 calculating the base address for the boot-time parts (i.e., the sections that have been loaded into boot-time memory 72), as well as the base address for the runtime parts. Image loader 62 may then use the relocation (reloc) data from each image to fix-up the boot-time parts and the runtime parts, as indicated at block 252. In addition, image loader 62 may copy the reloc data for the runtime parts to runtime memory, in case that data is needed in runtime to fix up the runtime sections, as indicated at block 254. However, image loader 62 may not copy the reloc data for the boot-time parts to runtime memory, since that data will not be needed once OS 50 has booted.

The process may then pass through connector A back to block 214, with image loader 62 repeating the operations described above, as necessary, for any remaining images to process.

Figure 3:
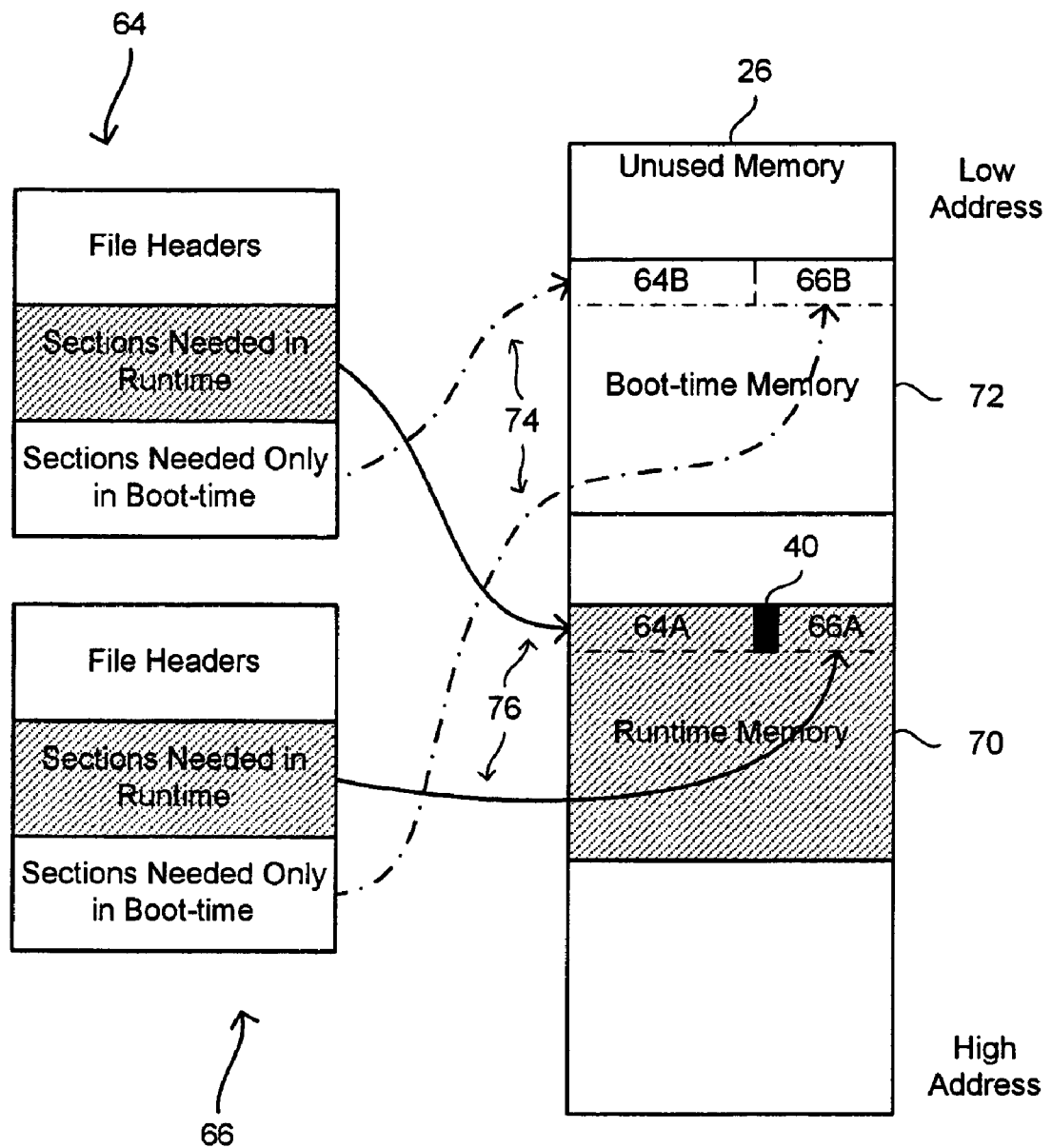
FIG. 3 is a block diagram depicting example PE images and a related memory map.

FIG. 3 is a block diagram depicting example PE images and a related memory map. In particular, FIG. 3 depicts two PE images 64, 66 for runtimes drivers, with each PE image having various file or image headers, one or more sections with instructions that may be needed in runtime (shown filled with diagonal lines), and one or more other sections with instructions that may be needed only in boot-time. Also, the memory map shows the relative placement of boot-time memory 72 and runtime memory 70 in RAM 26.

As indicated by dashed arrows 74—and in accordance with blocks 242 and 244 of FIG. 2—the boot-time sections of each image are loaded into boot-time memory 72, and the runtime sections are loaded into runtime memory 70: The loaded drivers that are based on the boot-time and runtime sections are labeled with reference numbers 64A, 64B, 66A, and 66B. In the example embodiment, runtime driver 68 in FIG. 1 is an alias for runtime driver 64A. Also, the solid black block at reference number 40 is intended to illustrate that image loader 62 leaves only a small gap between consecutive runtime drivers (e.g., 8, 16, or 32 bytes), as image loader 62 aligns the loaded images using boundaries smaller than the page size provided by OS 50, as indicated above.

Figure 4:
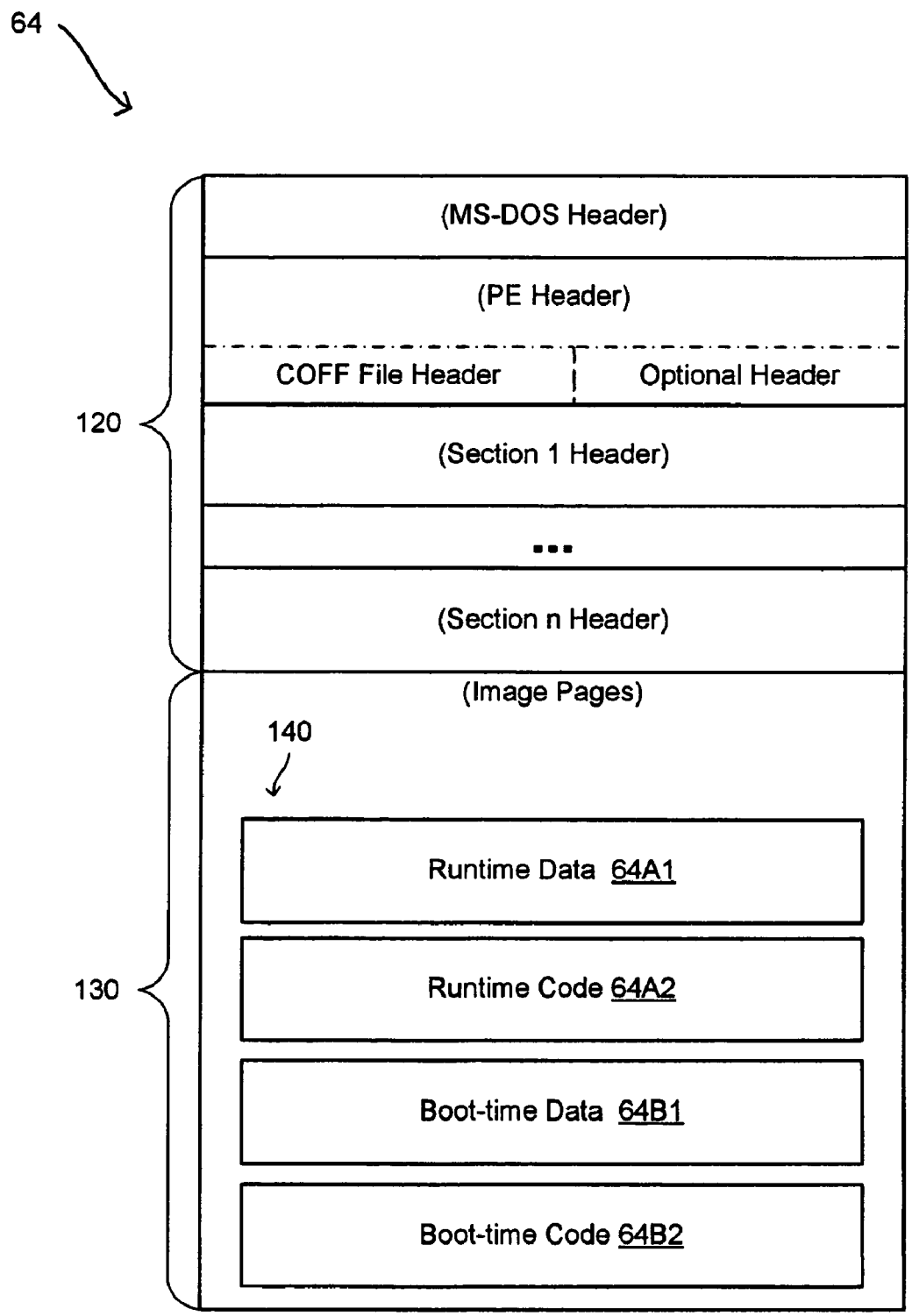
FIG. 4 is a block diagram illustrating an example PE image in greater detail.

FIG. 4 is a block diagram illustrating an example PE image in greater detail. In FIG. 4 the example PE file is PE image 64. As described above with regard to FIG. 1, that image includes instructions to be loaded into runtime memory 70 to implement runtime driver 68. As shown in FIG. 4, PE image 64 includes various headers 120, and one or more image pages 130. Also, in the example embodiment, PE image 64 includes four distinct subdivisions 140: a runtime data section 64A1, a runtime code section 64A2, a boot-time data section 64B1, and a boot-time code section 64B2. Those subdivisions may be created by compiling a COFF file with compiler directives such as those described above.

For instance, in the example embodiment, section 64A1 may correspond to a standard data section, and section 64A2 may correspond to a standard text section, while section 64B1 may contain the data from the section that was given a discardable attribute and the name .initd (as described above), and section and 64B2 may contain the code from the section that was given a discardable attribute and the name .initc (as described above). Section 64A1 may contain data used by section 64A2, such as global variables, etc. Section 64A2 may contain code which can provide service to the runtime system. Section 64B1 may contain data used by section 64B2, such as global variables, etc. Section 64B2 may contain code such as the driver entry point and functions only used during the boot time.

When image loader 62 loads PE image 64 into RAM, it may load runtime data section 64A1 and runtime code section 64A2 into runtime memory 70 to form runtime driver 64A, in accordance with the general operations depicted in FIG. 3. Similarly, image loader 62 may load boot-time data section 64B1 and boot-time code section 64B2 into boot-time memory 72 to form boot-time driver 64B. Runtime driver 64A and boot-time driver 64B may be considered to be parts of a single driver.

As has been described, in the example embodiment, the space efficiency of the runtime memory used by a platform framework is significantly enhanced, relative to conventional approaches for implementing or instantiating platform frameworks on processing systems.

In light of the principles and example embodiments described and illustrated herein, it will be recognized that the described embodiments can be modified in arrangement and detail without departing from such principles. For instance, in the paragraphs above, the present disclosure refers to programs that are loaded into RAM in the boot process. However, in some embodiments, processing systems may be configured to use processor cache in place of RAM. Accordingly, unless the context clearly requires otherwise, references herein to RAM should be understood to include cache that is serving as RAM. For instance, a reference to the operation of loading data into RAM refers as well to the operation of loading data into a processor cache that serves as RAM.

Also, although the foregoing discussion has focused on particular embodiments, other configurations are contemplated as well. Even though expressions such as "in one embodiment," "in another embodiment," or the like may be used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine-accessible media encoding instructions for performing the operations of the invention. Such embodiments may also be referred to as program products. Such machine-accessible media may include, without limitation, storage media such as floppy disks, hard disks, CD-ROMs, ROM, and RAM; as well as communications media such antennas, wires, optical fibers, microwaves, radio waves, and other electromagnetic or optical carriers. Accordingly, instructions and other data may be delivered over transmission environments or networks in the form of packets, serial data, parallel data, propagated signals, etc., and may be used in a distributed environment and stored locally and/or remotely for access by single or multi-processor machines, It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. The hardware, software, or combinations of hardware and software for performing the operations of the invention may also be referred to as logic or control logic.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. A method for loading a portable executable (PE) image, the method comprising:
    determining whether a PE image for a platform firmware runtime service includes a discardable section;
    loading part of the PE image into runtime memory to be used exclusively by the platform firmware; and
    in response to determining that the PE image includes a discardable section, omitting at least part of the discardable section when loading the PE image into the runtime memory.

2. A method according to claim 1, further comprising:
    loading the discardable section into boot-time memory to be used by the platform firmware.

3. A method according to claim 1, further comprising:
    using an alignment granularity of less than one kilobyte when loading the PE images into the runtime memory.

4. A method according to claim 1, further comprising:
using an alignment granularity of less than one hundred bytes when loading the PE images into the runtime memory.

5. A method according to claim 1, further comprising:
pre-allocating an area of runtime memory for PE images; and
loading sections from multiple PE images into the pre-allocated area of runtime memory.

6. A method according to claim 1, further comprising:
pre-allocating an area of runtime memory for PE images; and
loading sections from multiple PE images into the pre-allocated area of runtime memory; and
using an alignment granularity of less than one kilobyte when loading the PE images into the pre-allocated area of runtime memory.

7. A method according to claim 1, further comprising:
recording a runtime memory size in association with a first boot process; and
pre-allocating an area of runtime memory for PE images in association with a subsequent boot process, based at least in part on the recorded runtime memory size.

8. A method according to claim 1, further comprising:
recording a runtime memory size in association with a first boot process;
pre-allocating an area of runtime memory for PE images in association with a subsequent boot process, based at least in part on the recorded runtime memory size; and
loading sections from multiple PE images into the pre-allocated area of runtime memory.

9. A method according to claim 1, further comprising:
recording a first runtime memory size in association with a first boot process;
pre-allocating an area of runtime memory for PE images in association with a subsequent boot process, based at least in part on the recorded runtime memory size;
loading sections from multiple PE images into the pre-allocated area of runtime memory;
determining how much of the pre-allocated area of runtime memory was used; and
recording a second runtime memory size in association with the second boot process, based at least in part on the determination of how much of the pre-allocated area of runtime memory was used.

10. A method according to claim 1, wherein the PE image comprises header information, the method further comprising:
omitting at least part of the header information when loading the PE image into the runtime memory.

11. A method for creating a portable executable (PE) image, the method comprising:
receiving an object file at a linker, the object file containing multiple discardable sections with instructions for performing boot-time operations and a section with instructions for performing runtime operations to be provided by platform firmware; and
generating an executable PE image, based at least in part on the object file;
wherein the operation of generating the executable PE image comprises grouping the multiple discardable sections together in the PE image.

12. A method according to claim 11, wherein the operation of grouping the multiple sections with instructions for performing boot-time operations together in the PE image comprises:
grouping the multiple discardable sections together below the section with instructions for performing runtime operations.

13. A method for booting a processing system, the method comprising:
retrieving a portable executable (PE) image for a runtime service to be provided by platform firmware for the processing system;
determining whether the PE image includes a discardable section;
in response to determining that the PE image includes a discardable section, loading the discardable section into boot-time memory to be used by the platform firmware; and
loading part of the PE image into runtime memory to be used exclusively by the platform firmware; but
omitting at least part of the discardable section when loading the PE image into the runtime memory.

14. A method according to claim 13, further comprising:
pre-allocating an area of runtime memory for PE images;
loading sections from multiple PE images into the pre-allocated area of runtime memory; and
using an alignment granularity of less than four kilobytes when loading the PE images into the pre-allocated area of runtime memory.

15. A method according to claim 13, wherein the PE image comprises header information, the method further comprising:
omitting at least part of the header information when loading part of the PE image into the runtime memory.

16. An apparatus containing control logic for providing a runtime service for a processing system, the apparatus comprising:
a machine-accessible storage medium; and
a portable executable (PE) image in the machine-accessible storage medium, the PE image for providing a runtime service to be provided by platform firmware for the processing system, wherein the PE image comprises:
a section with instructions for performing runtime operations; and
multiple discardable sections with instructions for performing boot-time operations, wherein the multiple discardable sections are grouped together in the PE image.

17. An apparatus according to claim 16, wherein the multiple discardable sections are grouped together below the section with instructions for performing runtime operations.

18. A processing system with control logic for managing PE images, the processing system comprising:
a processor;
a machine-accessible storage medium responsive to the processor;
instructions in the machine-accessible storage medium which, when executed by the processor, implement an image loader; and
a portable executable (PE) image in the machine-accessible storage medium, the PE image for providing a runtime service in platform firmware for the processing system;
wherein the PE image comprises:
a section with instructions for performing runtime operations; and
multiple discardable sections with instructions for performing boot-time operations; and wherein the multiple discardable sections are grouped together in the PE image.

19. A processing system according to claim 18, wherein the image loader comprises control logic:
- to determine whether the PE image includes a discardable section;
- to load part of the PE image into runtime memory to be used exclusively by the platform firmware; and
- in response to determining that the PE image includes a discardable section, to omit at least part of the discardable section when loading the PE image into the runtime memory.

20. A processing system according to claim 19, wherein the image loader comprises control logic to load the discardable section into boot-time memory to be used by the platform firmware.

21. A processing system according to claim 19, wherein the image loader comprises control logic:
- to pre-allocate an area of runtime memory for PE images;
- to load sections from multiple PE images into the pre-allocated area of runtime memory; and
- to use an alignment granularity of less than four kilobytes when loading the PE images into the pre-allocated area of runtime memory.

* * * * *